United States Patent
Kim

(10) Patent No.: US 6,798,346 B2
(45) Date of Patent: Sep. 28, 2004

(54) DEVICE FOR FLOATING AN AUTOMOBILE AND COMMUNICATION IN AN EMERGENCY

(75) Inventor: Tae Woon Kim, Seoul (KR)

(73) Assignee: Kia Motors Corporation, Seoul (KR)

( * ) Notice: Subject to any disclaimer, the term of this patent is extended or adjusted under 35 U.S.C. 154(b) by 0 days.

(21) Appl. No.: 10/246,312

(22) Filed: Sep. 17, 2002

(65) Prior Publication Data

US 2003/0197599 A1 Oct. 23, 2003

(30) Foreign Application Priority Data

Apr. 19, 2002 (KR) ........................................ 2002-21431

(51) Int. Cl.⁷ .............................................. G08B 21/00
(52) U.S. Cl. .................. 340/623; 340/618; 340/539.22; 340/539.1; 340/426.36
(58) Field of Search ................................. 340/604, 605, 340/618, 619, 620, 621, 623, 624, 539.22, 539.1, 426.36

(56) References Cited

U.S. PATENT DOCUMENTS

| | | | | |
|---|---|---|---|---|
| 4,580,125 A | * | 4/1986 | Gotanda | ................ 340/426.36 |
| 4,717,904 A | * | 1/1988 | Murakami | ................ 340/539.1 |
| 5,823,608 A | * | 10/1998 | Tanaka et al. | ........... 296/146.2 |
| 6,070,546 A | * | 6/2000 | Downey et al. | ............ 114/123 |
| 6,281,647 B1 | * | 8/2001 | Sasaki | ........................ 318/264 |
| 6,337,550 B1 | * | 1/2002 | Takahashi et al. | .......... 318/483 |
| 6,486,630 B2 | * | 11/2002 | Takagi | ........................ 318/445 |

* cited by examiner

Primary Examiner—Jeffery Hofsass
Assistant Examiner—Daniel Previl
(74) Attorney, Agent, or Firm—Morgan Lewis & Bockius LLP

(57) ABSTRACT

The invention comprises a sensor to detect submergence of an automobile, a control means for generating output signals, air bags, driving units for the air bags, and a unit for generating and broadcasting an emergency signal. The device according to the present invention further comprises an emergency switch driven by sensing that the automobile is not started by the key switch but forcibly started. According to the present invention, submergence of an automobile can be prevented and the human life can be protected, and also by the generation of an emergency signal in case of abnormal manipulation of a key due to a car theft and the like, the property can be protected.

5 Claims, 3 Drawing Sheets

DEVICE FOR FLOATING AN AUTOMOBILE AND COMMUNICATION IN AN EMERGENCY

FIELD OF THE INVENTION

The present invention relates to a device for floating an automobile and communication in an emergency, and more particularly to a device including air bags mounted on an automobile that are inflated in case of an accidental fall of the automobile into water, and also to an emergency signal generated in case of abnormal manipulation of a key due to a car theft and the like.

BACKGROUND OF THE INVENTION

In general, conventional automobiles are not provided with an alarm system which senses accidents and informs the outside of the accidents, nor with a device for floating automobiles in an emergency. Therefore, if an automobile falls into the water by an accident, e.g., if an automobile falls down into the water by the collision against other automobiles or by the sudden collapse of a bridge, it is rarely possible for a driver or passengers to escape before the automobile is submerged.

Also, as most of the conventional automobiles are typically not supplied with an alarm system for unexpected accidents, e.g., if an automobile is stolen and it is manipulated by means other than the key which fits the lock, there was no way of automatically determining the location of the stolen automobile.

Therefore, demands for measures which can prevent these unexpected accidents resulting in the loss of human lives and property, have become increased.

SUMMARY OF THE INVENTION

The present invention is directed to a device for floating an automobile and communication in an emergency that substantially obviates one or more of the problems encountered due to limitations and disadvantages of the prior art. For example, the present invention can reduce the possibility of the loss of the human lives by preventing or delaying the submergence of an automobile. The present invention also enables prompt recognition of the location of a stolen automobile by emergency signals.

A preferred embodiment of the present invention comprises a plurality of immersion sensing means which are mounted on both right and left sides of front and rear parts of an automobile inside the bottom surface of an automobile to detect immersion of an automobile and generate electric signals. A control means generates a predetermined output signal upon detecting the electric signals from any one of the sensing means. Air bags are mounted on both right and left sides of front and rear wheel parts of the automobile to keep the automobile floating on the surface of water. A driving unit drives the air bags in response to the output signal from the control means. Means is also provided for generating an emergency signal of a predetermined frequency into the air in response to the output signal from the control means.

Preferably, the sensing means comprises a casing having an open top and an inwardly slanted upper part of its side wall. A sensor is vertically mounted on the bottom surface of the casing to detect the inflow of water up to a predetermined height and to generate electric signals to the control means. A cover placed above the top of the casing covers the inwardly slanted upper part of the casing at ordinary times, so that non-threatening water, such as rain water, can be prevented from flowing into the casing. The cover also forms an interstice from the casing such that when the automobile is immersed in water the casing is completely submerged so that water can be introduced into the casing through the interstice.

In addition, the device for floating an automobile and communication in an emergency according to the present invention further comprises an emergency switch mounted between a key switch and an input terminal of the control means. The emergency switch is triggered upon sensing that the automobile is not started normally by the key switch, but forcibly started.

The means for generating an emergency signal is preferably mounted at an output terminal of the control means. An emergency signal of a predetermined frequency is broadcast in response to the output signal from the control means, which is generated when the immersion of the automobile is detected by the sensing means or the emergency switch is driven.

Therefore, according to the present invention, it becomes possible to potentially reduce the loss of human lives by accurately sensing the immersion of the automobile and taking appropriate emergency measures. Further, according to the present invention, in case of a car accident or a car theft, the emergency signal is automatically generated so that the location of the automobile can be promptly recognized and prompt emergency measures can be taken, thereby protecting the human lives and property.

BRIEF DESCRIPTION OF THE DRAWINGS

The accompanying drawings, which are included to provide a further understanding of the invention and are incorporated in and constitute a part of this specification, illustrate an embodiment of the invention and together with the description serve to explain the principles of the invention.

DETAILED DESCRIPTION OF THE PREFERRED EMBODIMENTS

Reference will now be made in detail to preferred embodiments of the present invention in conjunction with accompanying drawings.

According to the present invention, a device for floating an automobile and communication in an emergency comprises a plurality of immersion sensing means 1. Means 1 are mounted on the automobile, preferably on the right and left sides of front and rear parts, inside the bottom surface of the automobile to detect immersion and generate electronic signals in response thereto. A control means 2 generates predetermined output signals upon detecting the electronic signals from any one of the sensing means 1. Controller 2 preferably comprises a processor and memory, as well as conventional associated hardware and software, such that it may be programmed to execute the control functions according to the present invention by a person of ordinary skill in the art. Air bags 4 are preferably mounted on both right and left sides of front and rear wheel parts to keep the automobile floating on the surface of water in case of immersion. A driving unit 3 drives the air bags 4 in response to the output signal from the control means 2. Means 7 generates an emergency signal of a predetermined frequency into the air, i.e., broadcasts the signal, in response to the output signal from the control means 2.

Figure 1:
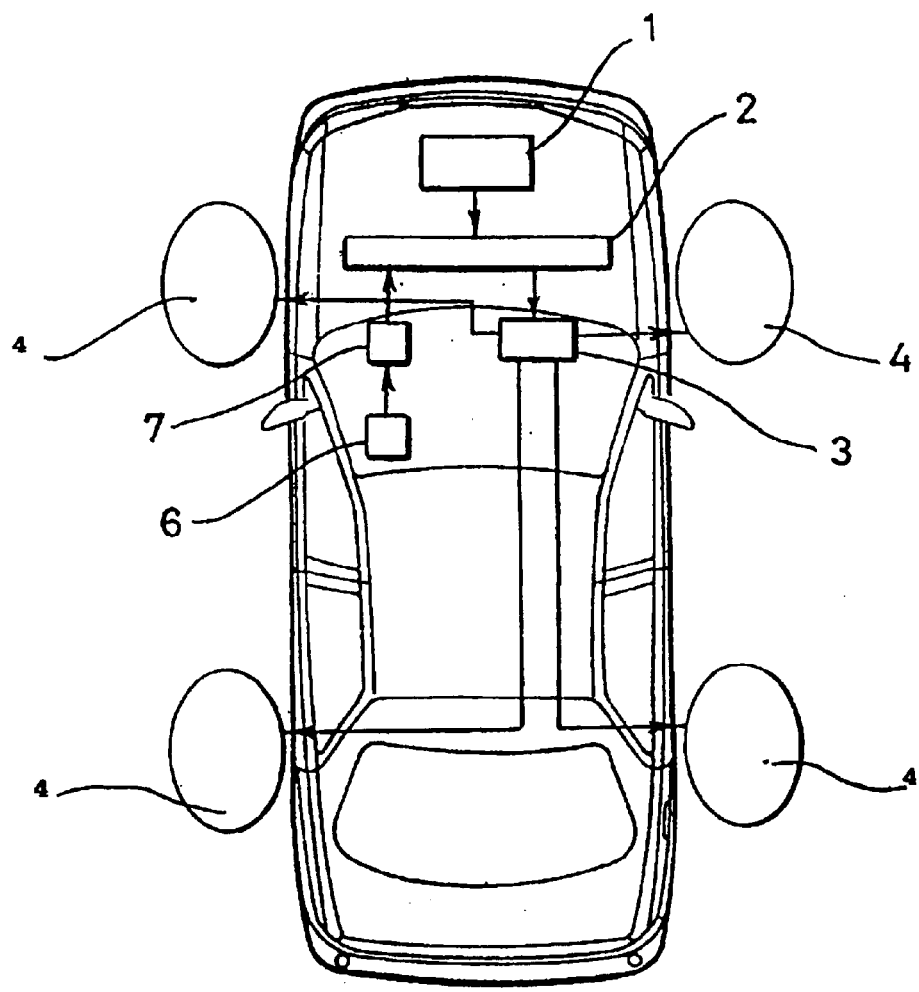
FIG. 1 is a schematic plane view of an automobile in which a device for floating an automobile and communication in an emergency according to the present invention is installed.
Figure 2:
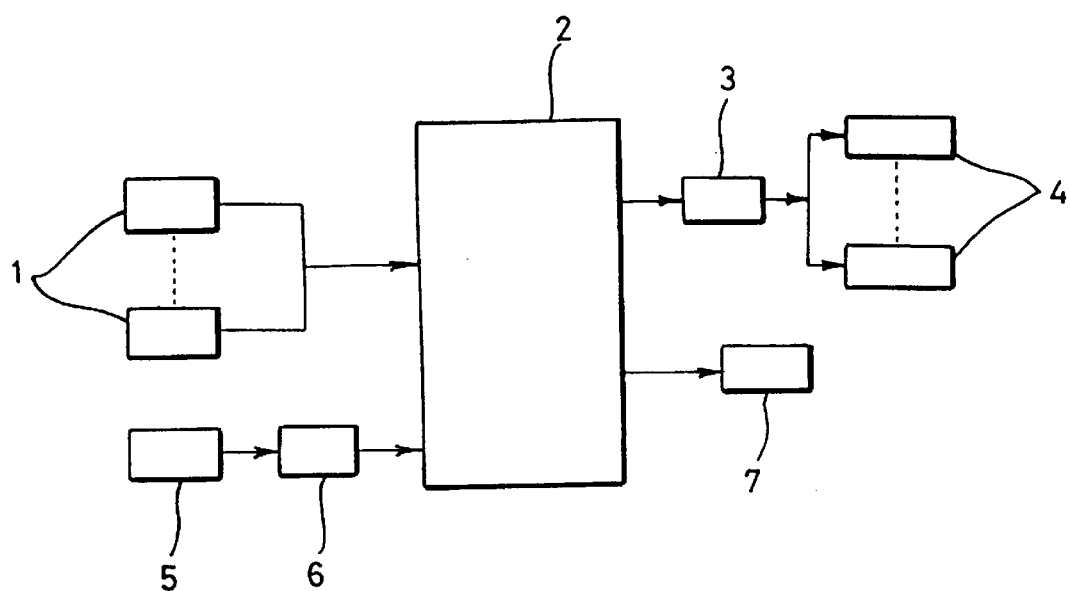
FIG. 2 is a block diagram of the device for floating an automobile and communication in an emergency according to the present invention.
Figure 3:
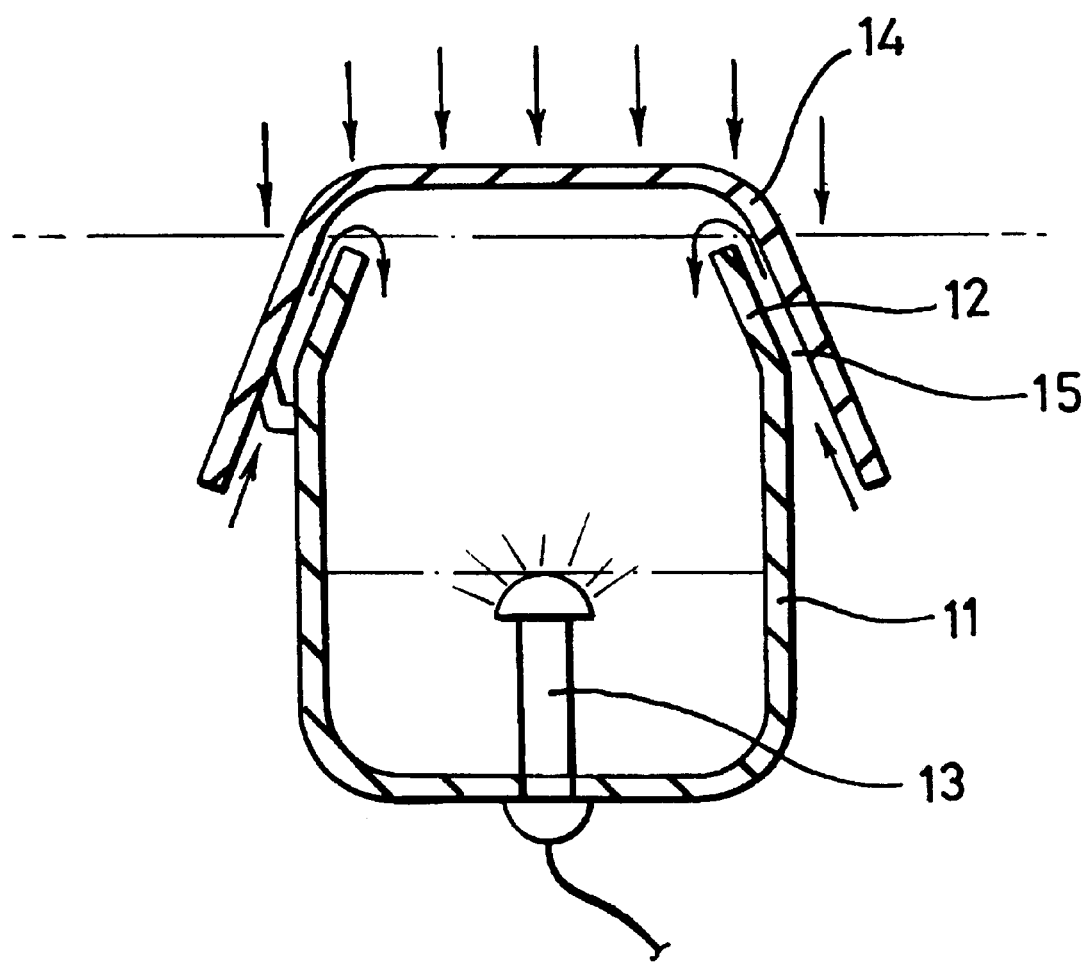
FIG. 3 is a cross-sectional view of the sensing means of the device according to the present invention.

Preferably, as shown in FIG. 3, sensing means 1 comprises a casing 11 having an open top and an inwardly-slanted upper side wall-part 12. A sensor 13 is mounted, preferably vertically, on the bottom surface of the casing 11 to detect the inflow of water up to a predetermined height and to generate and transmit electronic signals to the control means 2. A cover 14 is placed above the top of the casing 11 to cover the inwardly slanted upper part 12 of the casing 11 at ordinary times, so that water, such as rain, can be prevented from flowing into the casing 11 in situations other than immersion of the vehicle. Cover 14 forms an interstice 15 with the casing 11 such that when the automobile is immersed and the casing 11 is completely submerged, water can be introduced into the casing 11 through the interstice 15.

In addition, the device for floating an automobile and communication in an emergency according to the present invention further comprises an emergency switch 6 mounted between a key switch 5 and an input terminal of the control means 2. Emergency switch 6 is driven by sensing that the automobile has been started not by the key switch 5, but otherwise forcibly started.

The means for generating an emergency signal 7 is preferably mounted at an output terminal of the control means 2. Means 7 generates an emergency signal of a predetermined frequency and broadcasts it in response to the output signal from the control means 2, which may occur either when immersion of the automobile is detected by the sensing means 1 or when the emergency switch 6 is tripped.

As the center of gravity of an automobile is typically in its engine compartment, and as the engine normally sinks first when the automobile submerges into the water, it would be sufficient for the sensing means 1 to be installed only in the engine compartment. However, in actual car accidents, parts of the automobile other than the engine compartment may submerge first, regardless of the location of the center of gravity. Therefore, it is preferable to install the sensing means 1 on both right and left sides of both the front and rear parts of the automobile.

In the case of an accidental immersion of the vehicle, if the level of water introduced into the casing 11 reaches the upper end of the sensor 13, which is fixed on the bottom of the casing 11, the sensor 13 generates electric signals. The control means 2 recognizes the signals representing immersion of the automobile and generates output signals and transmit them to the air bag driving unit 3 and to the means for generating an emergency signal 7.

The air bags 4, which are respectively mounted on both right and left sides of the front and rear wheels, are inflated and the automobile can float on water due to the buoyancy of the air bags. In addition, the means for generating an emergency signal 7 broadcasts an emergency signal of a specific frequency in response to the output signal from the control means 2. A remote control center (not shown) receives such an emergency signal broadcasts and can precisely recognize the location and situation of the automobile. By this process, prompt emergency measures can be taken, and the loss of human lives due to unexpected accidents can be potentially reduced.

Also, if the engine of the automobile is not started normally by the key switch 5, but forcibly started after disassembling the key box, the emergency switch 6 connected between the key switch 5 and the control means 2 is automatically tripped. In response to tripping of the emergency switch 6, the control means 2 recognizes that the automobile is not normally operated and generates an output signal to drive the means for generating an emergency signal 7. Therefore, the emergency signal of a predetermined frequency is once again broadcast and the remote control center receives this emergency signal and can precisely recognize the location and situation of the automobile. By this process, the automobile can be promptly tracked down, and it can be stopped, and the driver of a stolen automobile may be arrested. That is, prompt measures against the car theft can be taken and thus car theft can considerably be potentially reduced and property protected.

It will be apparent to those skilled in the art that various modifications and variations can be made to the device of the present invention without departing from the spirit and scope of the invention. The present invention covers the modifications and variations of this invention provided they come within the scope of the appended claims and their equivalents.

What is claimed is:

1. A device for floating an automobile and communication in an emergency, comprising:

a plurality of sensing means mounted on the automobile to detect immersion of the automobile and generate signals in response thereto;

a control means for generating predetermined output signals upon detecting the signals from any one of the sensing means;

air bags mounted on the automobile to keep the automobile floating on the surface of water in case of submergence;

a driving unit for inflating the air bags in response to the output signal from the control means; and means for generating and broadcasting an emergency signal of a predetermined frequency in response to the output signal from the control means, wherein the sensing means comprises:

a casing having a bottom surface and side walls with an open top and an inwardly slanted upper part of the side walls;

a sensor mounted on the bottom surface of the casing to detect inflow of water up to a predetermined height and to generate electric signals in response thereto; and a cover placed above the top of the casing to cover the inwardly slanted upper part of the casing so that non-immersion water can be prevented from flowing into the casing, said cover forming an interstice such that when the automobile is immersed and the casing is completely submerged into the water, water can be introduced into the casing through the interstice.

2. The device of claim 1, further comprising an emergency switch mounted between a key switch and an input terminal of the control means, said emergency switch driven by sensing that the automobile is started by means other than the key switch, and wherein the means for generating an emergency signal is mounted at an output terminal of the control means and broadcasts the emergency signal in response to the output signal from the control means generated when the immersion of the automobile is detected by the sensing means or when the emergency switch is tripped.

3. The device of claim 1, wherein said sensing means are mounted on right and left sides of front and rear parts of the automobile.

4. The device of claim 1, wherein said air bags are mounted on both right and left sides of the front and rear, adjacent wheels of the automobile.

5. The device of claim 1, wherein said sensor is vertically mounted in the casing.

* * * * *